(12) United States Patent
Dvorkis

(10) Patent No.: US 6,932,274 B2
(45) Date of Patent: Aug. 23, 2005

(54) VIBRATION REDUCTION IN ELECTRO-OPTICAL READERS

(75) Inventor: Paul Dvorkis, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 156 days.

(21) Appl. No.: 10/445,765

(22) Filed: May 27, 2003

(65) Prior Publication Data

US 2004/0238639 A1 Dec. 2, 2004

(51) Int. Cl.$^7$ ................................................. G06K 7/10
(52) U.S. Cl. .......................... 235/462.36; 235/462.43; 235/462.38; 235/462.4
(58) Field of Search ...................... 235/462.01–462.49, 235/472.01–472.03

(56) References Cited

U.S. PATENT DOCUMENTS

| | | | | |
|---|---|---|---|---|
| 5,015,831 A | * | 5/1991 | Eastman et al. | 235/462.36 |
| 5,367,151 A | * | 11/1994 | Dvorkis et al. | 235/462.36 |
| 5,621,371 A | * | 4/1997 | Dvorkis et al. | 235/462.36 |
| 5,698,835 A | * | 12/1997 | Dvorkis et al. | 235/462.43 |
| 5,714,746 A | * | 2/1998 | Dvorkis et al. | 235/462.45 |
| 5,900,617 A | * | 5/1999 | Dvorkis et al. | 235/472.01 |
| 5,984,188 A | * | 11/1999 | Dvorkis et al. | 235/472.01 |
| 6,056,200 A | * | 5/2000 | Dvorkis et al. | 235/472.01 |
| 6,347,744 B1 | * | 2/2002 | Metlitsky | 235/472.02 |
| 6,360,949 B1 | * | 3/2002 | Shepard et al. | 235/462.43 |
| 6,491,225 B1 | * | 12/2002 | Dvorkis et al. | 235/472.01 |
| 6,708,886 B2 | * | 3/2004 | Dvorkis et al. | 235/462.43 |

* cited by examiner

Primary Examiner—Michael G. Lee
Assistant Examiner—Kimberly D. Nguyen
(74) Attorney, Agent, or Firm—Kirschstein, et al.

(57) ABSTRACT

Vibration is minimized in an electro-optical reader for reading indicia by oscillating a counterweight and a scan component to move simultaneously toward each other, and to move simultaneously away from each other. A magnet is mounted for joint movement with the counterweight and the scan component. An electromagnetic coil magnetically interacts with each magnet to cause the counterweight and the scan component to move with oppositely directed moments that counterbalance each other.

12 Claims, 3 Drawing Sheets

VIBRATION REDUCTION IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, reducing vibration in the system during symbol reading.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. No. 4,251,798; No. 4,369,361; No. 4,387,297; No. 4,409,470, No. 4,760,248 and No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a predetermined target location. Preferably, the cross-section of the beam spot at the target location approximates the minimum width between symbol regions of different light reflectivity, i.e., the bars and spaces.

In conventional readers, the light beam is directed by a scan component along a light path toward a target symbol. The reader operates by repetitively scanning the light beam in a scan pattern, for example, a line or a series of lines across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

The scan pattern that scans the symbol can take a variety of forms, such as repeated line scan, standard raster scan, jittered raster scan, fishbone, petal, etc. These beam patterns are generated by controlled motions of the scan component in the beam path. Typically, the scan component is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a symbol can be scanned in a given time period, the chances of obtaining a valid read of the symbol are increased. This is particularly important when the symbols are borne by moving objects, such as packages traveling on a conveyor belt.

Many applications call for a hand-held reader where a user aims the light beam at the symbol, and the beam executes a scan pattern to read the symbol. For such applications, the arrangement of electro-optical components must be compact in order to be accommodated in a hand-held package which may be pistol-shaped. Moreover, such readers must be lightweight and structurally robust to withstand physical shock resulting from rough handling. It is also desirable that minimal power be consumed during operation to promote battery usage.

The repetitive movement of the scan component generates vibrations which are propagated through a support on which the scan component is mounted and, in turn, to the reader itself. When the reader is held by the user, these vibrations are transmitted to the user's hand and are objectionable, especially after long term usage of the reader. Moreover, depending on the scan rate, the vibrations can generate audible hum, which is likewise annoying after prolonged operation.

SUMMARY OF THE INVENTION

Objects of the Invention

One object of this invention is to provide an improved arrangement for and method of reducing vibration in a reader for reading a data-encoded symbol.

Another object of this invention is to provide an arrangement which is compact, lightweight, durable and efficient in construction and quiet in operation, and thus is ideally suited for portable hand-held applications.

FEATURES OF THE INVENTION

In keeping with these objects and others which will become apparent hereinafter, one feature of this invention resides, briefly stated, in an arrangement for, and a method of, reducing vibration in a reader for electro-optically reading indicia, such as one-and/or two-dimensional bar code symbols.

The invention provides a support, preferably a printed circuit board, a movable scan component for scanning the indicia, and a movable counterweight. Both the scan component and the counterweight are mounted on the support for oscillating movement about respective first and second axes of oscillation.

In accordance with this invention, a drive is operative for minimizing vibrations caused by the oscillating scan component from being transmitted to the support and, in turn, to the reader. The drive includes a first permanent magnet mounted on the scan component for joint movement therewith, a second permanent magnet mounted on the counterweight for joint movement therewith, and an energizable electromagnetic coil mounted between the magnets and operative, when energized by a periodic drive signal, to magnetically interact with the magnets and cause the scan component and the counterweight to move simultaneously toward each other and to move simultaneously away from each other. The turning effect or moment of the force used to move the scan component in one direction is counterbalanced by the moment used to move the counterweight in the opposite direction.

Thus, the moment that the scan mirror exerts on the support during oscillation is counterbalanced by the opposite moment that the counterweight exerts on the support. Preferably, this is achieved by making the weights of the scan component and the counterweight equal, as well as the perpendicular distances of the scan component and the counterweight to their respective axes of oscillation. A symmetrical mounting is obtained by fixing the scan component and the counterweight on respective resilient arms of a mounting element fixed to the support. In a rest position, the arms are generally parallel. During reading, the arms move to planes that intersect each other. Not only is vibration reduced, but the arrangement is quieter in operation.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
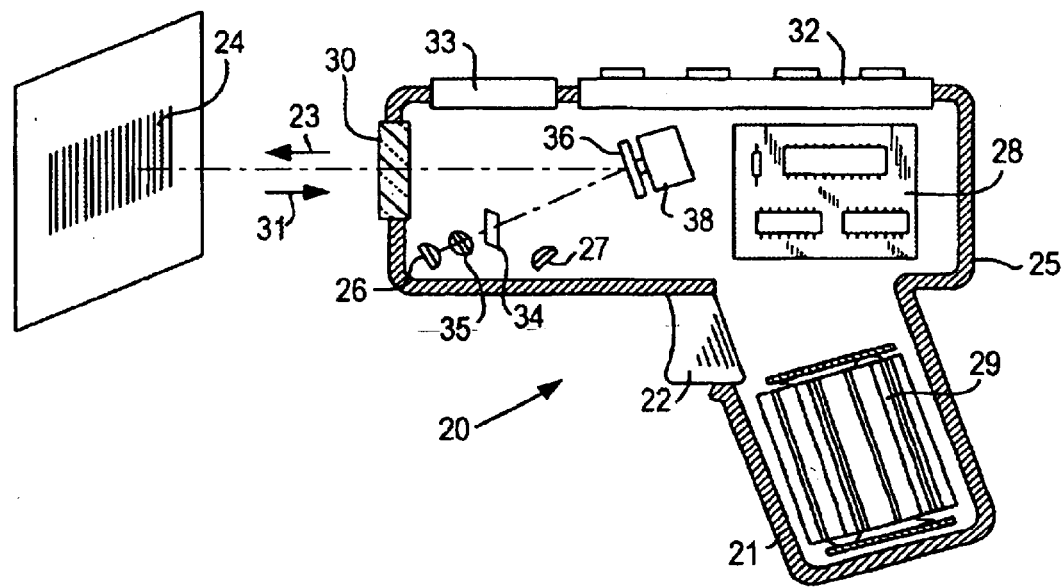
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

Figure 2:
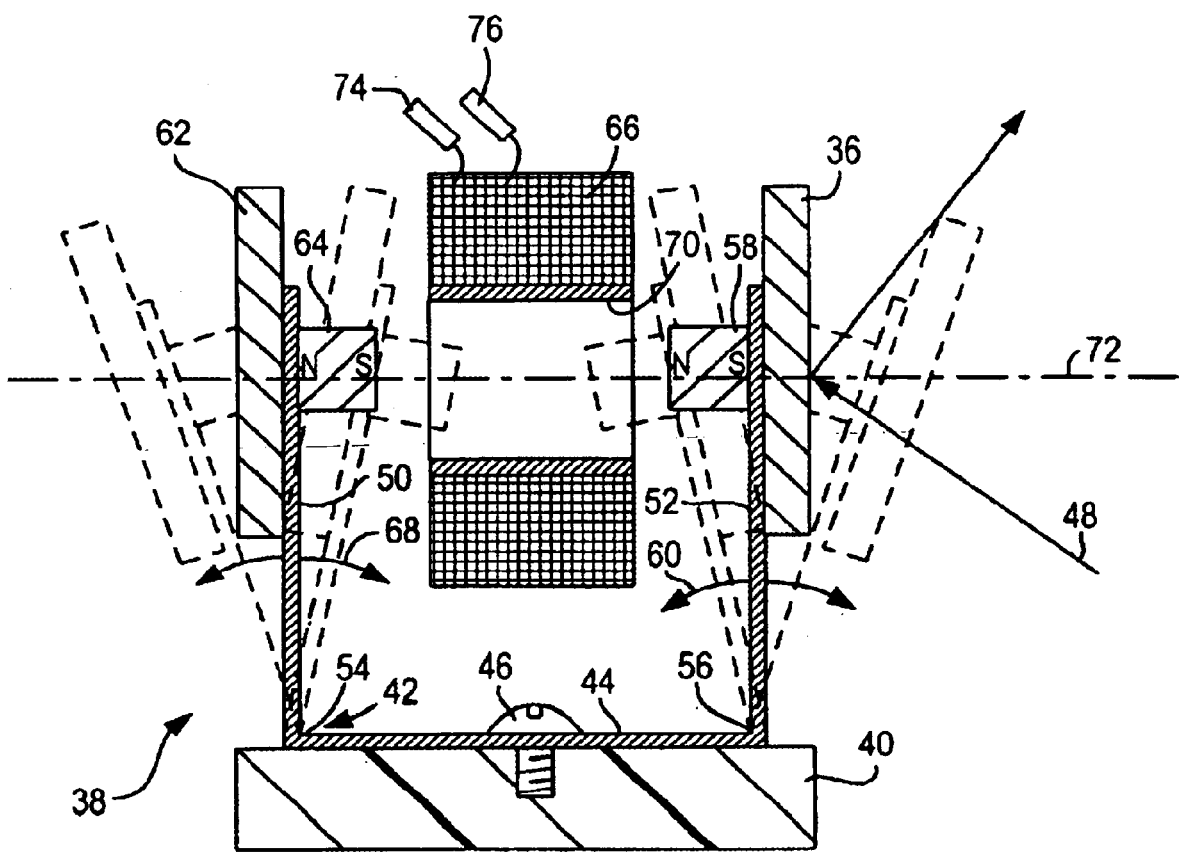
FIG. 2 is a side elevation view of a vibration reducing arrangement in accordance with one embodiment of this invention for use in the reader of FIG. 1.

In accordance with this invention, the drive 38 is configured as shown in FIG. 2. A support 40, preferably a printed circuit board, is mounted within the housing 25. A mounting element 42 has a base 44 fixed to the support by a fastener 46, and a pair of upright resilient arms 50, 52 movable about respective first 54 and second 56 axes of oscillation. Mounting element 42 is preferably constituted of a metallic spring steel, but other resilient materials including plastic could be employed. In the illustrated solid line position, the arms 50, 52 are parallel. In the preferred embodiment, the arms 50, 52 are planar leaf springs.

The scan mirror 36 is exteriorly mounted on arm 52 and, as shown, reflects a light beam 48 incident thereon toward the incidia 24 to be scanned and read. A permanent magnet 58 is interiorly mounted on arm 52 and is jointly oscillatable with the mirror 36 about the axis 56 in the circumferential directions represented by double-headed arrow 60.

In accordance with this invention, a counterweight 62 preferably having a weight equal to the weight of mirror 36 is exteriorly mounted on arm 50. A permanent magnet 64 is interiorly mounted on arm 50 and is jointly oscillatable with the counterweight 62 about the axis 54 in the circumferential directions represented by the double-headed arrow 68.

An electromagnetic coil 66 is mounted between the magnets 64, 58. Coil 68 has a central passage 70 extending along a coil axis 72. The magnets 64, 58 are mounted on, and axially spaced apart along, the coil axis 72. The magnets 64, 58 are oriented so that opposite poles face each other. The magnets 64, 58 have respective magnetic axes coaxial with the coil axis 72.

The coil 66 is energized by a periodic drive signal, for example a sinusoidal or sawtooth waveform, conducted along wires 74, 76 to create an alternating magnetic field which interacts with the permanent magnetic fields produced by the permanent magnets to cause the magnets 64, 58 and, in turn, the arms 50, 52, as well as the counterweight and the mirror 36, to simultaneously move toward each other, and thereupon to simultaneously move apart from each other.

It is generally known in the art for the scan mirror 36 to be oscillated by the interaction of magnetic fields produced by a coil and a magnet. However, this oscillation induces vibration in the support 40 which, in turn, is propagated to the housing 25 of the reader. A vibrating hand-held reader is uncomfortable to hold. Also, depending on the frequency of vibration, objectionable noise can be heard.

The motion of the counterweight tends to reduce the vibration and noise problems of the art. The turning effect or moment of the force used to move the mirror 36 in one direction is counterbalanced by the turning effect or moment of the force used to move the counterweight in the opposite direction. The combined weight of the counterweight and magnet 64 on the one hand matches the combined weight of the mirror and the magnet 58 on the other hand. Also, the perpendicular distances of the respective forces to the axes 54, 56 are preferably the same.

It will be understood that this invention achieves vibration reduction by generating countermoments that balance each other. Hence, the weight of the counterweight need not equal the weight of the mirror, but the perpendicular distance to the axis 54 will have to be adjusted so that the product of the force exerted on the mirror multiplied by its perpendicular distance to the axis 56 matches the product of the force exerted on the counterweight multiplied by the perpendicular distance to the axis 54.

The energized coil 66 need not actively pull and push each magnet 64, 58. It is sufficient for the energized coil to either pull or push each magnet, whereupon energy stored in each resilient arm 50, 52 will be released upon deenergization of the coil to enable oscillation to continue. In other words, the energized coil can actively pull the magnet 58 toward the left in FIG. 2 and is then deenergized. The flexed arm 52 is now free to return to its rest position, but in doing so, will overshoot its rest position and move toward the right in FIG. 2, and again overshoot its rest position by moving toward the left. The deenergized coil is now reenergized, at which time, the cycle repeats.

The scan component 36 need not be a flat mirror as illustrated, but could be a different optical component such as a lens or an aperture stop, or could be a differently shaped mirror, such as a concave reflector, or could be a light source such as a laser diode which directly emits a laser beam. In addition, the scan component 36 need not be located solely in the outgoing path of a light beam being directed to indicia 24, but could be located in the return path of light scattered off the indicia, in which case, the scan component is sweeping the field of view of the photodetector 27. Of course, the scan component 36 can be located in both the outgoing and return paths as shown in FIG. 1.

The distance through which each magnet moves depends upon the scan angle through which the light beam and/or the field of view must be steered. If necessary, the magnets can enter the opposite open axial ends of the passage 70.

Figure 3:
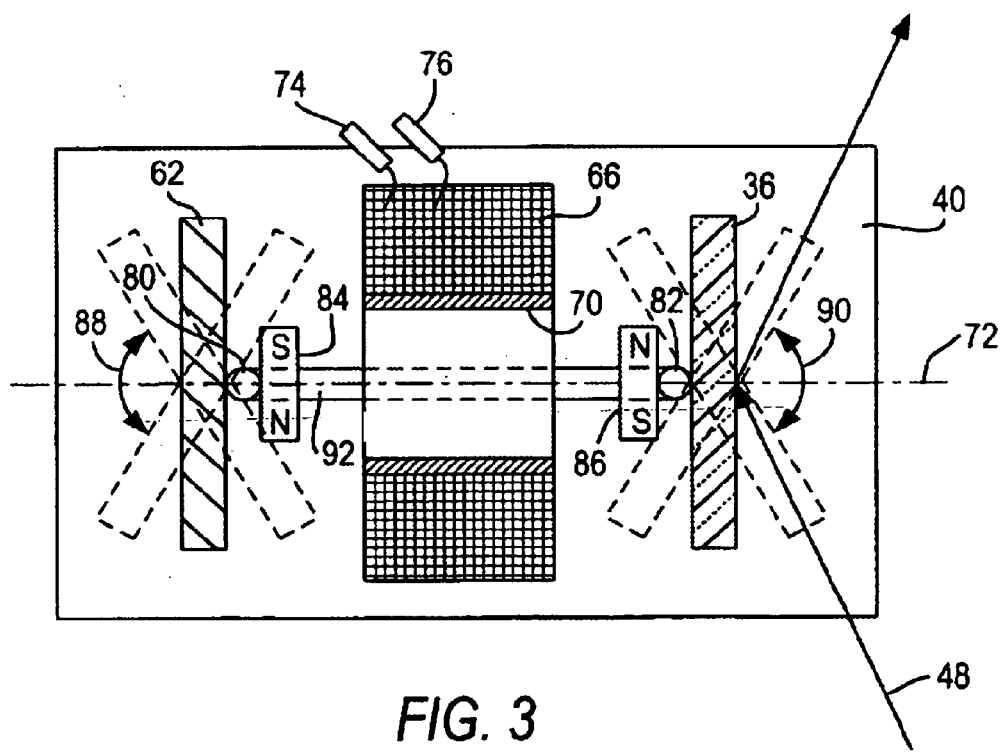
FIG. 3 is a top plan view of a vibration reducing arrangement in accordance with another embodiment of this invention.

In the side view of FIG. 2, each arm oscillates about axes 54, 56 that are parallel to the planar support 40. FIG. 3 depicts a top view of a different embodiment in which the scan component 36 and the counterweight 62 oscillate about axes that are perpendicular to the planar support 40.

Thus, as shown in FIG. 3, the scan mirror 36 and the counterweight 62 are mounted at opposite end regions of the coil 66 energized via electrical cables 74, 76 by a periodic drive signal as described above. In contrast with FIG. 2, the mirror and counterweight are not mounted on arms configured as planar leaf springs, but instead are mounted on torsion elements 80, 82 which extend along torsion axes perpendicular to the support 40. The torsion elements 80, 82 are configured as resilient wires having a circular cross-section and are twistable about their respective torsion axes.

Also, a first magnet 84 is jointly mounted with the counterweight on the wire 80, and a second magnet 86 is jointly mounted with the mirror on the wire 82. The magnetic axes of the magnets 84, 86 is perpendicular to the coil axis 72 in contrast to the FIG. 2 embodiment where the magnetic axes of the magnets 64, 58 were colinear with the coil axis 72.

In operation, energization of the coil 66 causes the magnets 84, 86 and, in turn, the wires 80, 82, as well as the counterweight and the mirror to twist in the directions indicated by the double-headed arrows 88, 90. As before, the moment produced by the twisting of the mirror is counterbalanced by the moment produced by the twisting of the counterweight in the opposite direction, thereby minimizing propagation of vibration and noise as described above.

The wires 80, 82 can be discrete elements, or can be interconnected by a base 92 that is fixed to the support 40. Alternatively, the base 92 can be secured directly to a casing of the coil 66.

It will be understood that each of the elements described above, or two or more together, also may find a useful application in other types of constructions differing from the types described above.

While the invention has been illustrated and described as embodied in a vibration reducing arrangement in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for reducing vibration in a reader for electro-optically reading indicia, comprising:
    a) a support;
    b) a movable scan component for scanning the indicia and mounted on the support for oscillating movement about a first axis;
    c) a movable counterweight mounted on the support for oscillating movement about a second axis; and
    d) a drive including a first permanent magnet mounted on the scan component for joint movement therewith, a second permanent magnet mounted on the counterweight for joint movement therewith, and an energizable electromagnetic coil mounted between the magnets and operative, when energized by a periodic drive signal, to magnetically interact with the magnets and cause the scan component and the counterweight to move with oppositely directed moments that counterbalance each other, thereby minimizing vibration propagation to the support.

2. The arrangement of claim 1, wherein the support is a printed circuit board.

3. The arrangement of claim 1, wherein the scan component is a mirror for reflecting light incident thereon toward the indicia.

4. The arrangement of claim 1, wherein the scan component and the counterweight have respective weights that balance each other and are respectively located away from the first and second axes at respective distances that are equal.

5. The arrangement of claim 1, and further comprising a mounting element mounted on the support and having a pair of resilient arms on which the scan component and the counterweight are respectively mounted.

6. The arrangement of claim 5, wherein the arms are planar leaf springs in mutual parallelism in a rest position.

7. The arrangement of claim 1, wherein the scan component and the counterweight move simultaneously toward each other, and move simultaneously away from each other during energization of the coil.

8. The arrangement of claim 1, wherein the coil has an annular shape and bounds an inner passage extending through the coil along a coil axis, and wherein the magnets have magnetic axes that are coaxial with the coil axis.

9. The arrangement of claim 8, wherein the magnets create respective permanent magnetic fields at opposite axial end regions of the coil, and wherein the energized coil creates an alternating magnet field that interacts with both permanent magnetic fields.

10. The arrangement of claim 1, and further comprising elongated torsion elements on which the scan component and the counterweight are respectively mounted for twisting movement about the first and second axes, respectively, and wherein the first and second axes extend lengthwise along the torsion elements.

11. The arrangement of claim 10, wherein the torsion elements are wires.

12. A method of reducing vibration in a reader for electro-optically reading indicia, comprising the steps of:
  a) mounting a movable scan component for scanning the indicia on a support for oscillating movement about a first axis;
  b) mounting a movable counterweight on the support for oscillating movement about a second axis;
  c) mounting a first permanent magnet on the scan component for joint movement therewith;
  d) mounting a second permanent magnet on the counterweight for joint movement therewith; and
  e) energizing an electromagnetic coil mounted between the magnets with a periodic drive signal to magnetically interact with the magnets and cause the scan component and the counterweight to move with oppositely directed moments that counterbalance each other, thereby minimizing vibration propagation to the support.

* * * * *